US008571522B2

(12) United States Patent
Hu

(10) Patent No.: US 8,571,522 B2
(45) Date of Patent: Oct. 29, 2013

(54) AUTHENTICATION METHOD FOR THE MOBILE TERMINAL AND A SYSTEM THEREOF

(75) Inventor: Yimu Hu, Shenzhen (CN)

(73) Assignee: ZTE Corporation (CN)

( * ) Notice: Subject to any disclaimer, the term of this patent is extended or adjusted under 35 U.S.C. 154(b) by 196 days.

(21) Appl. No.: 13/130,873

(22) PCT Filed: Nov. 27, 2008

(86) PCT No.: PCT/CN2008/073224
§ 371 (c)(1),
(2), (4) Date: May 24, 2011

(87) PCT Pub. No.: WO2010/060242
PCT Pub. Date: Jun. 3, 2010

(65) Prior Publication Data
US 2011/0230166 A1    Sep. 22, 2011

(51) Int. Cl.
*H04M 1/66* (2006.01)
*H04B 1/38* (2006.01)
*H04L 29/06* (2006.01)

(52) U.S. Cl.
USPC ............................ 455/411; 455/558; 713/159

(58) Field of Classification Search
USPC .......... 455/410, 411, 557, 558, 559; 713/159, 713/186
See application file for complete search history.

(56) References Cited

U.S. PATENT DOCUMENTS

| | | | | |
|---|---|---|---|---|
| 5,091,942 A | * | 2/1992 | Dent | 380/46 |
| 5,778,071 A | * | 7/1998 | Caputo et al. | 713/159 |
| 5,878,142 A | * | 3/1999 | Caputo et al. | 713/159 |
| 6,778,828 B1 | * | 8/2004 | Chander et al. | 455/435.1 |
| 6,850,777 B1 | * | 2/2005 | Estes et al. | 455/558 |
| 7,974,414 B2 | * | 7/2011 | Burns | 380/270 |
| 7,979,054 B2 | * | 7/2011 | Baysinger | 455/411 |
| 2001/0034247 A1 | * | 10/2001 | Namiki | 455/558 |
| 2002/0006792 A1 | | 1/2002 | Usher et al. | |
| 2004/0023689 A1 | * | 2/2004 | Ahonen | 455/558 |
| 2005/0190918 A1 | * | 9/2005 | Burns | 380/270 |
| 2005/0191992 A1 | * | 9/2005 | Inoue et al. | 455/411 |

(Continued)

FOREIGN PATENT DOCUMENTS

CN    1852595 A    10/2006
CN    101193128 A    6/2008

(Continued)

OTHER PUBLICATIONS

International Search Report from Publication.

*Primary Examiner* — Christopher M Brandt
(74) *Attorney, Agent, or Firm* — Brooks Kushman P.C.

(57) ABSTRACT

A method and a system for authenticating a mobile terminal, and the method comprises: the mobile terminal using a preset password P to decrypt a key A stored in a subscriber information file to obtain a key Ki which is used in authentication; in a process of authentication, the mobile terminal using the key Ki and a random number sent by a network side to generate encrypted authentication response data, and sending the encrypted authentication response data to the network side; and the network side verifying the encrypted authentication response data sent by the mobile terminal, and returning an authentication success acknowledgement to the mobile terminal after the verification succeeds; wherein the subscriber information file is stored in a local memory of the mobile terminal, or a mobile memory device connected with the mobile terminal.

6 Claims, 3 Drawing Sheets

(56) References Cited

U.S. PATENT DOCUMENTS

| | | | |
|---|---|---|---|
| 2005/0266885 A1* | 12/2005 | Katayanagi | 455/558 |
| 2006/0129848 A1* | 6/2006 | Paksoy et al. | 713/193 |
| 2006/0258389 A1* | 11/2006 | Saito et al. | 455/550.1 |
| 2006/0270387 A1* | 11/2006 | Hirata et al. | 455/411 |
| 2007/0270127 A1* | 11/2007 | Santoro et al. | 455/411 |
| 2008/0070549 A1* | 3/2008 | Wang | 455/411 |
| 2008/0293377 A1* | 11/2008 | Pauliac | 455/411 |
| 2009/0061820 A1* | 3/2009 | Patel et al. | 455/411 |

FOREIGN PATENT DOCUMENTS

| | | |
|---|---|---|
| CN | 101202620 A | 6/2008 |
| CN | 101222712 A | 7/2008 |
| EP | 1976322 A1 | 10/2008 |

\* cited by examiner

AUTHENTICATION METHOD FOR THE MOBILE TERMINAL AND A SYSTEM THEREOF

CROSS-REFERENCE TO RELATED APPLICATION

This application is the U.S. national phase of PCT Application No. PCT/CN2008/073224 filed Nov. 27, 2008, the disclosure of which is incorporated in its entirety by reference herein.

TECHNICAL FIELD

The present invention relates to the communication field, and particularly, to a method and system for authenticating a mobile terminal.

BACKGROUND OF THE RELATED ART

General mobile terminals use intelligent cards such as the Subscriber Identification Module (SIM) card and so on as the device storing the subscriber identification information, network information and subscriber data. However, this method for storing the subscriber identification information requires that the mobile terminal should be equipped with a dedicated SIM card socket and the SIM card should keep the connection with the mobile terminal all the time in use. And once the mobile terminal is lost, that means the SIM card is lost as well. The subscriber can never use the services any more unless he reports the lost and applies for a new card.

Another method for storing subscriber identification information is the manufacturer writes the subscriber identification information into the read only memory of the mobile terminal before the mobile terminal leaves factory, and thus it avoids equipping and using the SIM card sockets and SIM cards. However, this method still does not solve the problem that subscribers can not continue to use services after the mobile terminals are lost. And when subscribers replace mobile terminals, they have to change mobile terminal numbers, which is not convenient very much.

Before using the network services, a mobile terminal needs to be registered and authenticated in the network. The process of registering and authenticating requires the subscriber identification information. Because the subscriber identification information is stored using above fixed ways (namely stored in a SIM card or solidified in the read only memory of the mobile terminals) in the prior art, so only subscribers who have special SIM cards or mobile terminals can be registered and authenticated in the network successfully to enjoy services provided by the network. This means subscribers cannot use the services provided by mobile operators unless by means of mobile terminals, and can not use the services in the platforms which have more powerful software and hardware performances, such as a Personal Computer (PC). On one hand, this affects the subscriber's experiences, and on the other hand, it constrains the development of new services by mobile operators.

SUMMARY OF THE INVENTION

The technical problem to be solved in the present invention is to overcome the drawbacks in the prior art by providing a method and system for authenticating a mobile terminal, which makes the subscriber use various services provided by the mobile operators without relying on a certain special mobile terminal.

In order to solve above problem, the present invention provides a method for authenticating a mobile terminal, and the method comprises:

the mobile terminal using a pre-set password P to decrypt a key A stored in a subscriber information file to obtain a key Ki which is used in authentication;

in a process of authentication, the mobile terminal using the key Ki and a random number sent by a network side to generate encrypted authentication response data, and sending the encrypted authentication response data to the network side; and the network side verifying the encrypted authentication response data sent by the mobile terminal, and returning an authentication success acknowledgement to the mobile terminal after the verification succeeds;

wherein said subscriber information file is stored in a local memory of the mobile terminal, or a mobile memory device connected with the mobile terminal.

Additionally, before the process of authentication begins, the mobile terminal sends an International Mobile Subscriber Identity (IMSI) stored in said subscriber information file to the network side;

after verifying the encrypted authentication response data sent by the mobile terminal successfully, the network side judges whether there is another mobile terminal using the same IMSI to access the network and carries out the following operations if yes:

breaking a connection with an accessed mobile terminal; and/or sending a notification message that there is another mobile terminal using the same IMSI to access the network to the mobile terminal by which the encrypted authentication response data is sent.

Additionally, said subscriber information file further includes an identification number which is used for uniquely identifying different subscriber information files belonging to the same IMSI;

the network side records a corresponding relationship between said identification number and the IMSI when the mobile terminal accesses the network;

the mobile terminal sends said identification number together with said encrypted authentication response data to the network side, and the network side judges whether there is another mobile terminal using the same IMSI to access the network according to the identification number.

Additionally, if the network side verifies the encrypted authentication response data sent by the mobile terminal in failure, the network side sends an authentication failure acknowledgement to the mobile terminal; and after receiving the authentication failure acknowledgement, the mobile terminal judges whether authentication failure times exceed a pre-set value, and makes said subscriber information file unavailable if yes.

Additionally, said subscriber information file further includes one or more of the followings: a subscriber identification number, an unlocking code, a call record, a subscriber card folder, and a short message record.

The present invention also provides a system for authenticating a mobile terminal, including: an authentication device at a network side and a mobile terminal; wherein said mobile terminal includes: a subscriber information management unit and a subscriber identification information storage unit; wherein said subscriber information management unit is used for obtaining a subscriber information file from said subscriber identification information storage unit, and using a pre-set password P to decrypt a key A stored in the subscriber information file to obtain a key Ki which is used in authentication;

and in a process of authentication, said subscriber information management unit is further used for using said key Ki and a random number sent by said authentication device at the network side to generate encrypted authentication response data, and sending the encrypted authentication response data to the authentication device at the network side;

said authentication device at the network side is used for verifying the encrypted authentication response data sent by said subscriber information management unit, and sending an authentication success acknowledgement to said subscriber information management unit after the verification succeeds;

wherein said subscriber identification information storage unit is equipped in a local memory of said mobile terminal, or a mobile memory device connected with said mobile terminal.

Additionally, said subscriber information management unit is also used for sending an International Mobile Subscriber Identity (IMSI) stored in the subscriber information file to said authentication device at the network side;

after verifying the encrypted authentication response data sent by said subscriber information management unit successfully, said authentication device at the network side judges whether there is another mobile terminal using the same IMSI to access the network, if yes, the following operations are carried out:

breaking a connection with an accessed mobile terminal; and/or sending a notification message that there is another mobile terminal using the same IMSI to access the network to said subscriber information management unit.

Additionally, said subscriber information file further includes an identification number which is used for uniquely identifying different subscriber information files belonging to the same IMSI;

said authentication device at the network side records a corresponding relationship between said identification number and the IMSI when the mobile terminal accesses the network;

said subscriber information management unit sends said identification number together with said encrypted authentication response data to said authentication device at the network side, and said authentication device at the network side judges whether there is another mobile terminal using the same IMSI to access the network according to the identification number.

Additionally, if said authentication device at the network side verifies the encrypted authentication response data in failure, said authentication device at the network side sends an authentication failure acknowledgement to the mobile terminal;

after receiving the authentication failure acknowledgement, said subscriber information management unit judges whether authentication failure times exceed a pre-set value, and makes said subscriber information file unavailable if yes.

Additionally, said subscriber information file further includes one or more of the followings: a subscriber identification number, an unlocking code, a call record, a subscriber card folder, and a short message record.

Using the method and the system of the present invention, subscribers can choose to use the services registered by the same number (the IMSI) on a plurality of devices such as mobile terminals or PCs and so on, which benefits to usage and development of new services.

Besides, if the mobile terminal is lost, the subscriber can normally use registered services by a new mobile terminal which stores the subscriber information file, which avoids losses at most; once the subscriber information file is intruded, because the legal mobile terminal will be disconnected and require to input a password P, the subscriber can easily know about it so as to feed back it to the operator in time and obtain a new subscriber information file.

PREFERRED EMBODIMENTS OF THE PRESENT INVENTION

In the prior art, the method for storing and using the subscriber identification information is constituted in the initial development stage of the mobile communication system. The main reason is the mobile terminals at that time did not support mobile memory device substantially, and even the memory capabilities and data interaction abilities of the fixed memory devices are also very limited. However, a great many present mobile terminals can support mobile memory devices, such as TransFlash card (T card for short) and so on, or support data transmission ways such as the USB, Bluetooth and so on, which can conveniently and fleetly exchange information with other devices. This provides a likelihood of using a file storing the subscribe identification information (which is called a subscriber information or a digital certificate in the present invention) instead of the SIM card to implement identification and authentication for the subscriber of the mobile terminal during authentication.

Below it will describe the present invention by combining the figures and examples in details.

The subscriber information file put forward by the present invention to replace the SIM card includes following information: a key A, and subscriber basic information data such as a Personal Identity Number (PIN), a PIN Unblocking Key (PUK), an International Mobile Subscriber Identity and so on. Wherein.

Figure 1:
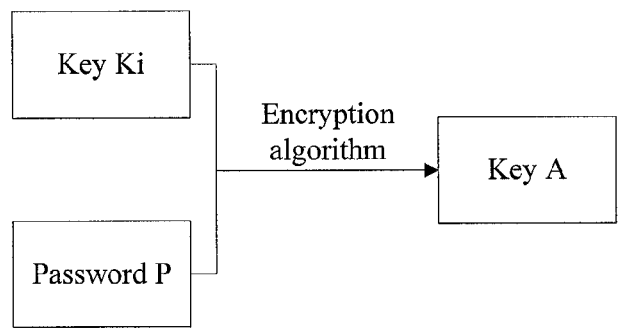
FIG. 1 is a schematic diagram of the relationship among the password P, key A and key Ki.

In the authentication process of the mobile communication network, a key Ki is necessary. For security reasons, the key Ki can not be saved and transmitted in plain text; and therefore the key Ki must be encrypted to save. The encrypted key Ki is key A, and the password which is used for encrypting the key Ki is called a password P. Generally, the password P is the password set by the subscriber at the time of opening an account. The relationship among the password P, key A and key Ki is shown in FIG. 1.

The subscriber basic information data, such as the PIN, PUK, and IMSI and so on, can also be encrypted using the password P to enhance the security of the subscriber basic information data.

The subscriber information file can also include communication service data such as call records, subscriber card folder, and short message records and so on. Similarly, the communication service data can also be encrypted using the password P to enhance the security.

Besides, the subscriber information file can also include an identification number which is used for uniquely identifying different subscriber information files belonging to the same IMSI (namely the different backups of the same subscriber information file).

Figure 2:
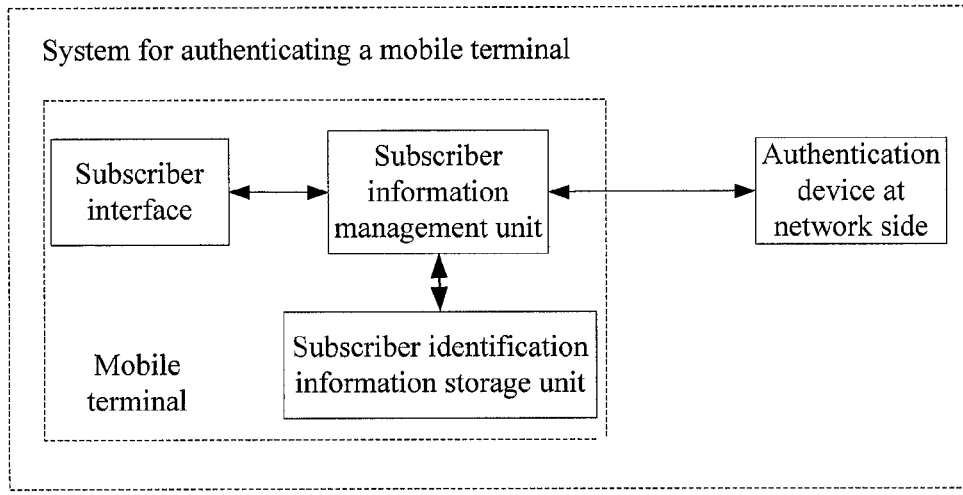
FIG. 2 is a schematic diagram of the structure of the system for authenticating a mobile terminal provided by the present invention.

FIG. 2 is a schematic diagram of the structure of the system for authenticating a mobile terminal provided by the present invention. As shown in FIG. 2, this system includes a mobile terminal and a network side. The mobile terminal includes: a subscriber interface, a subscriber information management unit, and a subscriber identification information storage unit. The network side includes a network side authentication device.

Wherein, the subscriber information management unit is used for obtaining the subscriber information file from the subscriber identification information storage unit, using a pre-set password P to decrypt the key A stored in the subscriber information file to get the key Ki which is for authenticating; and sending the IMSI stored in the subscriber information file to the authentication device of the network side; and in the authenticating process, the subscriber information management unit uses the key Ki and a random data sent by the authentication device of the network side to generate the encrypted authentication response data, and sends the encrypted authentication response data to the authentication device of the network side.

The subscriber information management unit is the general name for corresponding software part and hardware part, which can perform key encryption and decryption, operation of a series of special algorithms and data communication with other modules. Theoretically, own processors and memories of the present mobile terminals can completely implement the necessary calculation and memory functions of the unit. However, based on the consideration of the security and compatibility, this unit can also use separate processor and memory for the implementation.

The subscriber information management unit can completely support other functions included in current SIM card, including storing corresponding network data, service information, subscriber card folder, short messages, generating a Kc code used for encrypting communication and so on.

The authentication device of the network side is for verifying the encrypted authentication response data sent by the subscriber information management unit, and returning an authentication success acknowledgement to the subscriber information management unit after the verification succeeds.

Besides, after verifying the encrypted authentication response data sent by the subscriber information management unit successfully, the authentication device of the network side can also judge whether other mobile terminals use the same IMSI to access the network or not, if yes, the authentication device of the network side carries out following operations: breaking off the connection of the accessed mobile terminals; and/or, sending a notification message of other mobile terminals using the same IMSI to access the network to the subscriber information management unit.

If the subscriber information file includes an identification number which is used for uniquely identifying different subscriber information files belonging to the same IMSI, the authentication device of the network side is also required to record the corresponding relationship between the identification number and the IMSI when the mobile terminal accesses the network; and additionally, the subscriber information management unit also sends the identification number together with the encrypted authentication response data to the authentication device of the network side. The authentication device of the network side judges whether there is another mobile terminal accessing the network using the same IMSI according to the identification number.

The subscriber interface is used for showing notice information (such as that there are other terminals using the same IMSI to access the network as described above, the password is wrong and so on) to the subscriber, and used for inputting a password to the subscriber information management unit.

Besides, after receiving the notice information of other mobile terminals using the same IMSI to access the network, the subscriber sends an instruction of continuing to access or giving up accessing the network to the subscriber information management unit via the subscriber interface, and the subscriber information management unit informs the authentication device of the network side of continuing to access or give up accessing the network according to the subscriber's instruction.

Figure 3:
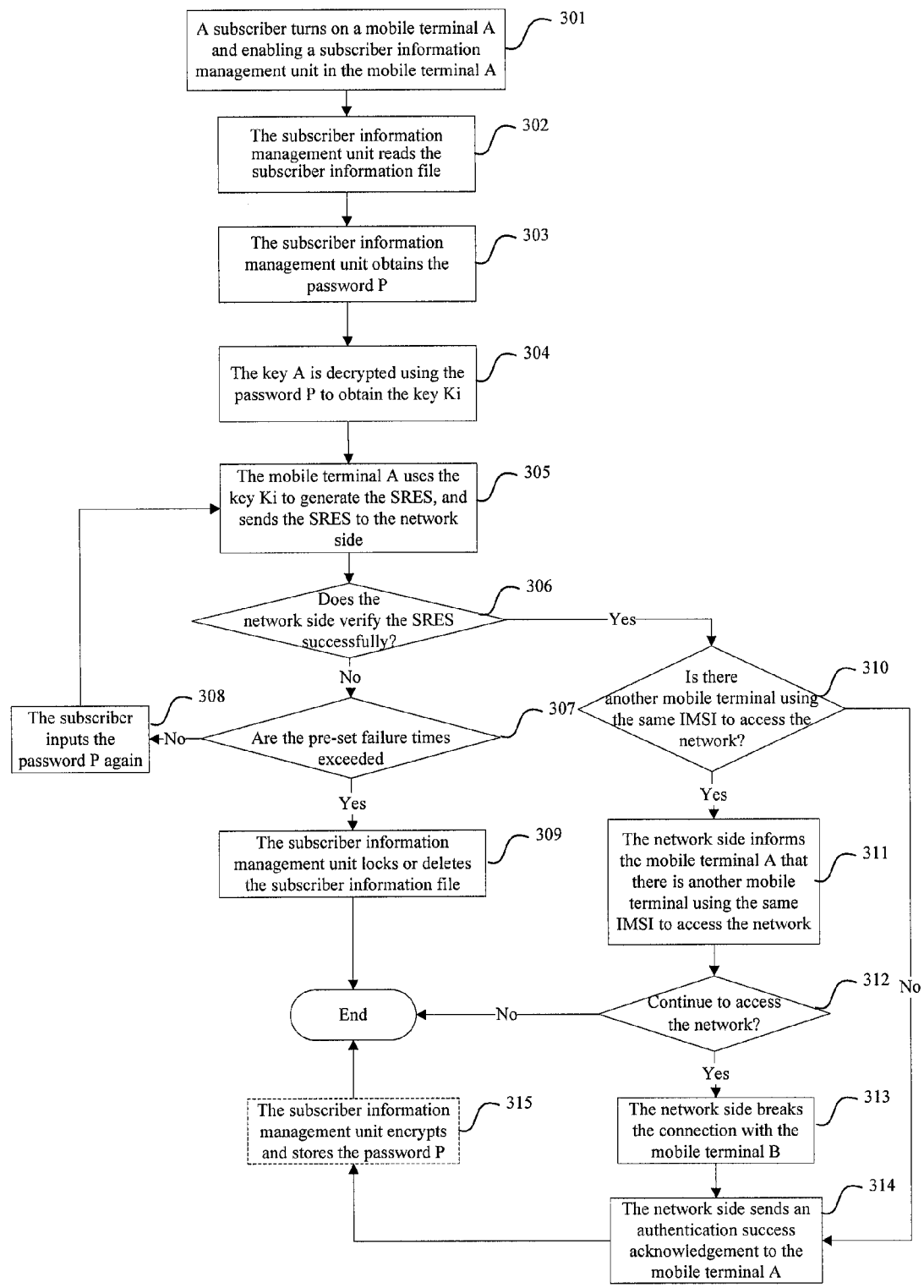
FIG. 3 is flow chart of the method for authenticating a mobile terminal using the subscriber information file according to an example of the present invention.

FIG. 3 is flow chart of the method for authenticating a mobile terminal using the subscriber information file according to an example of the present invention. This flow describes the method for a mobile terminal to use the subscriber identification information stored in a form of a file in the process from turn on to authentication in the network, comprising the following steps:

301: The subscriber turns on a mobile terminal, and enables the subscriber information management unit in the mobile terminal (denoted as mobile terminal A).

302: According to a pre-set or subscriber designated storage position, the subscriber information management unit reads the subscriber information file.

Above storage position (the position of the subscriber identification information storage unit) can be on the T card, or can be on other mobile storage devices connected with the mobile terminal, and also can be in the storage zones invisible for common subscribers in the local memory.

The aim of storing the subscriber information file in the storage zones invisible for common subscribers in the local memory is to avoid reading and copying the subscriber information file by unauthorized subscribers.

303: the subscriber information management unit judges whether there is the encrypted password P in the subscriber information file or the memory, if yes, the encrypted password P is decrypted to obtain the password P using a private algorithm of the subscriber information management unit; and if no, the subscriber is notified to input the password P.

304: The key A stored in the subscriber information file is decrypted using the password P to obtain the key Ki, if subscriber basic information data related to the authentication such as the IMSI and so on is encrypted as well, the subscriber basic information data also requires to be decrypted using the password P; and the mobile terminal A sends the subscriber basic information data related to authentication such as the IMSI and so on to the network side.

305: The authentication begins, and the mobile terminal A uses the key Ki and the 16 bytes of RAND (random data) received from the network side to generate the Secret RESponse (SRES) data (encrypted authentication response data) by A3 algorithm, and sends the SRES data to the network side.

Besides, the mobile terminal A can also report the identification number which is used for uniquely identifying different subscriber information files belonging to the same IMSI to the network side.

306: The network side uses the A3 algorithm and the same RAND to verify the SRES, and if the verification is successful, the step 310 is skipped to, or else the network side returns an authentication failure acknowledgement to the mobile terminal A.

307: If the authentication failure acknowledgement is received (which generally means the password P inputted by the subscriber is wrong), the subscriber information management unit judges whether the pre-set failure times are exceeded, if yes, step 309 is skipped to, or else the next step is carried out.

308: The subscriber is notified to input the password P again, and then the step 305 is skipped to.

309: The subscriber information management unit locks or deletes the subscriber information file, and this flow is ended.

The main aim of locking and deleting the subscriber information file is to make this subscriber information file unavailable in order to avoid reading, using and copying this file, and furthermore avoid continuing attempting to crack the password P by unauthorized subscribers.

The particular method of locking the subscriber information file could be: writing a locking identifier into a certain position in the subscriber information file, and when the subscriber information management unit reads the subscriber information file, the subscriber information management unit firstly judging whether this locking identifier exists, if yes, stopping reading; or else the subscriber information management unit establishing a locking list of the subscriber information files, recording each locked subscriber information file, wherein the subscriber information files can be identified by the identification numbers or the IMSI in this list.

310: The network side judges whether there are other mobile terminals using the same IMSI to access the network, if yes, the next step is carried out, or else step 314 is skipped to.

The network side can judge whether there is another mobile terminal using the same IMSI to access the network according to the identification number reported by the mobile terminal A.

311: The network side sends a notification message of another mobile terminal (denoted as mobile terminal B) using the same IMSI to access the network to the mobile terminal A.

312: The subscriber information management unit notifies the subscriber that there is another mobile terminal using the same IMSI to access the network, and notifies the subscriber to determine whether to continue to access the network, and informs the network side of the choice (continuing to access or giving up accessing the network) of the subscriber; the network side judges whether the mobile terminal A continues to access the network, if yes, the next step is carried out, or else this flow is ended.

313: The network side breaks off the connection with the mobile terminal B.

After the network side breaks off the connection with the mobile terminal B, if there is a subscriber information management unit in the mobile terminal B, the subscriber information management unit can delete password P stored locally, and when the mobile terminal B is authenticated again, the subscriber of the mobile terminal B is notified to input a password P.

314: The network side sends an authentication success acknowledgement to the mobile terminal A to allow the mobile terminal A to access the network, and records the corresponding relationship between the identification number reported by the mobile terminal A and the MST, and so far the authentication for the mobile terminal A is completed.

315: (optional step) after receiving the authentication success acknowledgement, if the password P is not stored locally, the subscriber information management unit of the mobile terminal A can adopt private algorithm to encrypt the password P and store the encrypted password P locally.

Figure 4:
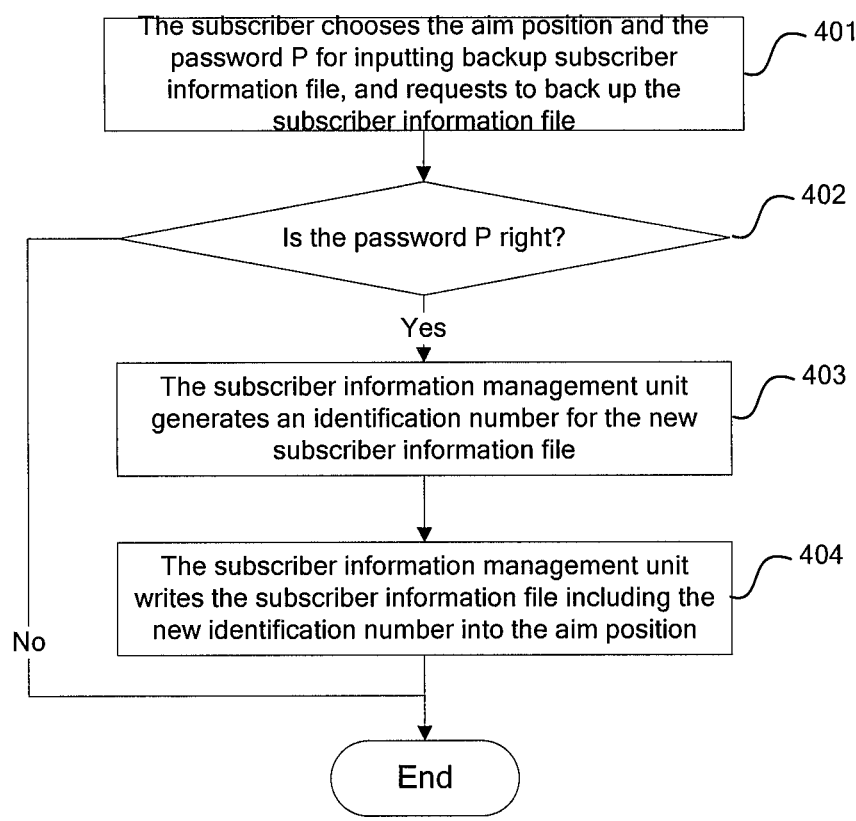
FIG. 4 is a flow chart of the method for backing up subscriber information according to an example of the present invention.

FIG. 4 is a flow chart of the method for backing up subscriber information according to an example of the present invention, comprising the following steps.

401: The subscriber chooses the aim position for inputting backup subscriber information file and the password P, and requests to back up the subscriber information file.

402: The subscriber information management unit checks whether the password P is right or not, if it is right, the next step is carried out, or else the subscriber information management unit notifies the subscriber of a password error, and this flow is ended.

If the subscriber information management unit can obtain encrypted password P from an initial subscriber information file or memory, the encrypted password P is decrypted, and the subscriber information management unit checks whether the password P input by the subscriber is right or not. If the subscriber information management unit cannot obtain the encrypted password P, the backup operation should be carried out for a next step after obtaining the authentication success acknowledgement sent by the network side in authentication process.

403: The subscriber information management unit generates a new identification number for the new subscriber information file backed up to the aim position, and includes this new identification number in this subscriber information file.

Besides being used to distinguish the different subscriber information files belonged to the same IMSI, this identification number can also be read by the subscriber information management unit and be shown to the subscriber. The function of the identification number is similar to the version number. Certainly, a plurality of version numbers of subscriber information files may be the same.

Besides, the subscriber information management unit also can judge whether this terminal is using or ever used the subscriber information files belonged to a certain IMSI and the subsequent backup version according to the identification number.

404: The subscriber information management unit writes the subscriber information file including the new identification number into the aim position to complete the backup of the subscriber information file.

Besides, when above backup operation is carried out, the subscriber can choose information content required to be back up, and can back up other information except for the identification information such as the IMSI and so on, such as the call record, subscriber's card folder, short message record and so on separately or all together, which is convenient for subscribers to change terminals.

According to the basic theory of the present invention, the above examples can have various modifications, such as:

(1) in order to further improve the security of the subscriber information file, the password P may not be stored in the local memory and subscriber information file, and is required to be input once when the operation in which the password P is used such as authentication is carried out.

(2) besides judging whether there are other mobile terminals using the same IMSI to access the network according to the identification number reported by the mobile terminal, the network side also can carry out above judgment according to other information, such as International Mobile Equipment Identity (IMEI).

(3) above examples replace the SIM card with the subscriber information file applied in the Global System for Mobile communication (GSM) as an example to describe the present invention; besides, the subscriber information file of the present invention can also replace the User Identity Module (UIM), Universal Subscriber Identity Module (USIM), applied in the Code Division Multiple Access (CDMA), the 3rd generation (3G) mobile communication network and so on.

INDUSTRIAL APPLICABILITY

Using the method and the system of the present invention, subscribers can choose to use the services registered by the same number (the IMSI) on a plurality of devices such as mobile terminals or PCs and so on, which benefits to usage and development of new services.

If the mobile terminal is lost, the subscriber can normally use registered services by a new mobile terminal which stores the subscriber information file, which avoids the lost at most. Certainly, subscribers should report lost of the former subscriber information file to the mobile operators, and obtain a new subscriber information file.

Once the subscriber information file is intruded, because the legal mobile terminal will be disconnected and will be required to input a password P, the subscriber can easily know about it so as to feed back it to the operator in time and obtain a new subscriber information file.

If the subscriber only replaces a mobile terminal, a method of turning off the mobile terminal or switching into the flying mode etc. can be used to notify the network side to break off the connection, and then the subscriber information file is started in the new mobile terminal, and the steps are the same with starting the subscriber information file for the first time.

What I claim is:

1. A method for authenticating a mobile terminal, the method comprising:

the mobile terminal using a pre-set password P to decrypt a key A stored in a subscriber information file to obtain a key Ki which is used in authentication;

in a process of authentication, the mobile terminal using the key Ki and a random number sent by a network side to generate encrypted authentication response data, and sending the encrypted authentication response data to the network side; and the network side verifying the encrypted authentication response data sent by the mobile terminal, and returning an authentication success acknowledgement to the mobile terminal after the verification succeeds;

before the process of authentication begins, the mobile terminal sending an International Mobile Subscriber Identity (IMSI) stored in said subscriber information file to the network side; and after verifying the encrypted authentication response data sent by the mobile terminal successfully, the network side judging whether there is another mobile terminal using the same IMSI to access the network and carrying out the following operations if yes:

breaking a connection with an accessed mobile terminal, and/or sending a notification message that there is another mobile terminal using the same IMSI to access the network to the mobile terminal by which the encrypted authentication response data is sent;

wherein said subscriber information file is stored in a local memory of the mobile terminal, or a mobile memory device connected with the mobile terminal, and said subscriber information file further includes an identification number which is used for uniquely identifying different subscriber information files belonging to the same IMSI;

and wherein the network side records a corresponding relationship between said identification number and the IMSI when the mobile terminal accesses the network; and the mobile terminal sends said identification number together with said encrypted authentication response data to the network side, and the network side judges whether there is another mobile terminal using the same IMSI to access the network according to the identification number.

2. The method as claimed in claim 1, further comprising:

if the network side verifies the encrypted authentication response data sent by the mobile terminal in failure, the network side sending an authentication failure acknowledgement to the mobile terminal; and after receiving the authentication failure acknowledgement, the mobile terminal judging whether authentication failure times exceed a pre-set value, and making said subscriber information file unavailable if yes.

3. The method as claimed in claim 1, wherein:

said subscriber information file further includes one or more of the following: a subscriber identification number, an unlocking code, a call record, a subscriber card folder, and a short message record.

4. A system for authenticating a mobile terminal, the system comprising:

an authentication device at a network side and a mobile terminal, wherein said mobile terminal includes: a subscriber information management unit and a subscriber identification information storage unit;

wherein said subscriber information management unit is usable for obtaining a subscriber information file from said subscriber identification information storage unit, and for using a pre-set password P to decrypt a key A stored in the subscriber information file to obtain a key Ki which is used in authentication; and in a process of authentication, said subscriber information management unit is further usable for using said key Ki and a random number sent by said authentication device at the network side to generate encrypted authentication response data, and for sending the encrypted authentication response data to the authentication device at the network side;

said authentication device at the network side is usable for verifying the encrypted authentication response data sent by said subscriber information management unit, and for sending an authentication success acknowledgement to said subscriber information management unit after the verification succeeds;

wherein said subscriber identification information storage unit is equipped in a local memory of said mobile terminal, or a mobile memory device connected with said mobile terminal;

said subscriber information management unit is also useable for sending an International Mobile Subscriber Identity (IMSI) stored in the subscriber information file to said authentication device at the network side;

after verifying the encrypted authentication response data sent by said subscriber information management unit successfully, said authentication device at the network side is configured to judge whether there is another mobile terminal using the same IMSI to access the network, if yes, the system is configured to break a connection with an accessed mobile terminal; and/or to send a notification message that there is another mobile terminal using the same IMSI to access the network to said subscriber information management unit;

wherein said subscriber information file further includes an identification number which is usable for uniquely identifying different subscriber information files belonging to the same IMSI;

said authentication device at the network side is configured to record a corresponding relationship between said identification number and the IMSI when the mobile terminal accesses the network;

said subscriber information management unit is configured to send said identification number together with said encrypted authentication response data to said authentication device at the network side, and said authentication device at the network side is configured to judge whether there is another mobile terminal using the same IMSI to access the network according to the identification number.

5. The system as claimed in claim 4, wherein:

if said authentication device at the network side verifies the encrypted authentication response data in failure, said authentication device at the network side is configured to send an authentication failure acknowledgement to the mobile terminal;

after receiving the authentication failure acknowledgement, said subscriber information management unit is configured to judge whether authentication failure times exceed a pre-set value, and to make said subscriber information file unavailable if yes.

6. The system as claimed in claim 4, wherein:

said subscriber information file further includes one or more of the following: a subscriber identification number, a unlocking code, a call record, subscriber card folder, and short message record.

* * * * *